Dec. 4, 1934.   A. L. DE LEEUW   1,983,019
GEAR CUTTING MACHINE AND METHOD
Filed Aug. 30, 1932   2 Sheets-Sheet 1
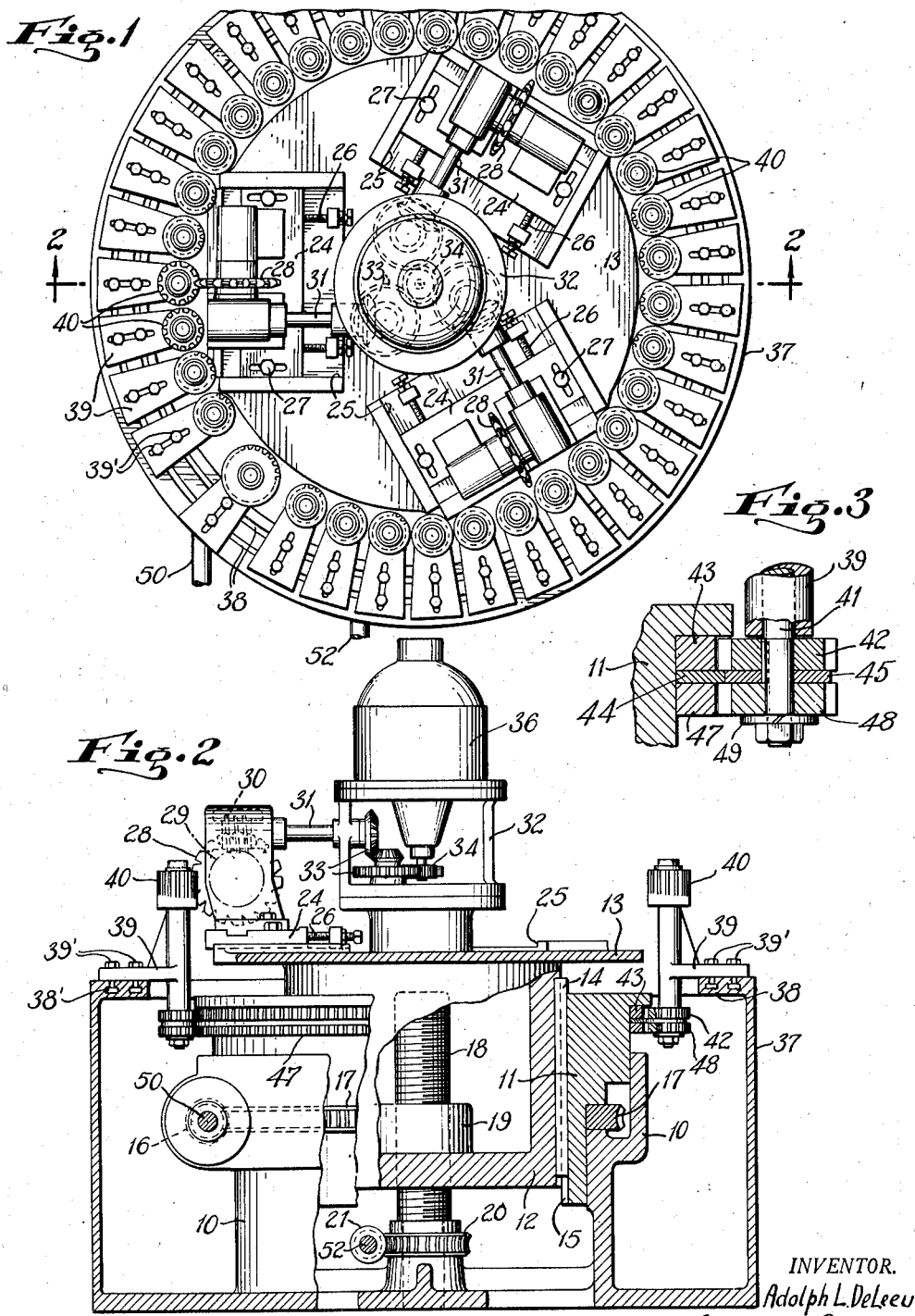
INVENTOR.
Adolph L. DeLeeuw
BY
H. Russell Bond
ATTORNEY Dec. 4, 1934.     A. L. DE LEEUW     1,983,019
GEAR CUTTING MACHINE AND METHOD
Filed Aug. 30, 1932     2 Sheets-Sheet 2
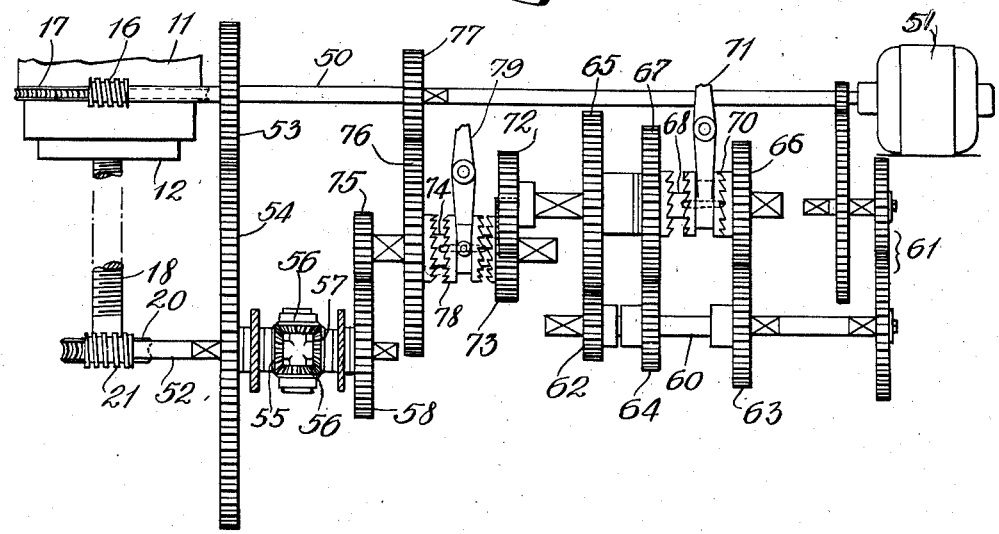
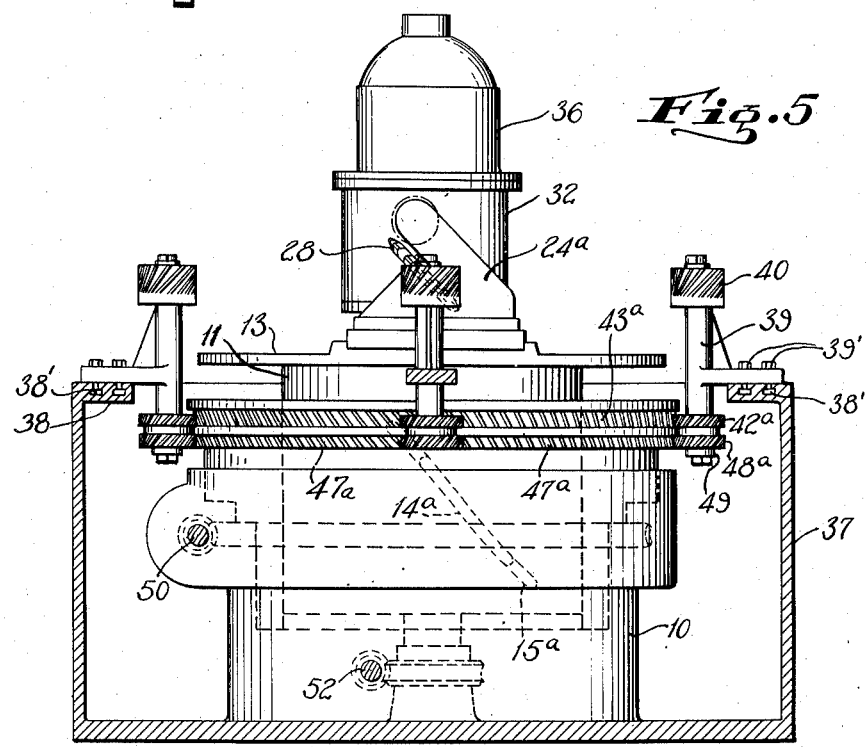
INVENTOR.
Adolph L. DeLeeuw
BY
ATTORNEY.

Patented Dec. 4, 1934

1,983,019

UNITED STATES PATENT OFFICE 1,983,019

GEAR CUTTING MACHINE AND METHOD

Adolph L. De Leeuw, Plainfield, N. J.

Application August 30, 1932, Serial No. 631,042

12 Claims. (Cl. 90—4)

The present invention relates to a method of and means for cutting gears and has for an object to provide for simultaneously cutting a plurality of gears which may be of similar or dissimilar dimensions.

An object of the invention is to provide a machine which will cut a group of gears with great accuracy and at exceedingly high speed.

Another object is to do away with indexing and to provide a machine with which the work may be set up without requiring the use of skilled operatives.

Heretofore gear cutting machines have been designed for cutting gears of a single size only, at each setting, and when, in quantity production, a variety of gears have been required for a particular mechanism, it has been necessary to make a run of gears of each size before a single set of the different sized gears was available for assembling the first of said mechanisms. Since, in the machine provided by the present invention, a variety of sizes of gears may be cut at a single setting, assembly can start as soon as the first set of gears comes off the machine and it is not necessary to keep a large supply of gears in stock.

In carrying out the present invention, I employ the same generating principle as that used in the machine disclosed in my Patent No. 1,666,737, issued April 17, 1928. However, said machine was adapted for grinding gears that had been previously cut, while the present invention provides a machine which is particularly adapted for cutting teeth in gear blanks.

My invention has for a further object to provide a method of and machine for cutting a plurality of spiral gears of the same size or of assorted sizes at a single setting of the machine.

Other objects and advantages of the invention will appear in the following description of a preferred embodiment and a modification of the same and thereafter the novelty and scope of the invention will be pointed out in the claims.

In the accompanying drawings;

Figure 1 is a plan view of an embodiment of my invention showing a machine adapted for cutting spur gears;

Fig. 2 is a view in somewhat irregular section taken substantially on the line 2—2 of Fig. 1;

Fig. 3 is a detail view on an enlarged scale of a portion of Fig. 2;

Fig. 4 is a diagrammatic view of the feeding and driving gear of the machine; and Fig. 5 is a view in side elevation partly broken away of a modified form of a machine adapted for cutting spiral gears.

In general the machine employs a central master gear which meshes with a peripheral series of master pinions. Each master pinion drives a spindle which carries a gear blank. One or more circular gear cutters are mounted on a table which is compelled to rotate with the central gear and which may also be fed in axial direction. When spur gears are to be cut, each cutter is rotated at a suitable cutting speed in a plane that is normal to that of the central gear and radial with respect to the axis of said gear. The peripheral cutting portion of each cutter is accurately conformed to the contour of a tooth of the master gear, and as the cutter is revolved with the table it cuts successively into the blanks on the spindles. At the same time the table is fed slowly downward so that by a succession of engagements with cutter the cut is carried down across the face of the gear blank. At each contact of the cutter with the blank there will be a rolling engagement between the cutter and that portion of the cut already made.

In order to compel each cutter to cut each tooth in each blank, the "hunting cob" principle is employed, i. e., the number of teeth in the master gear or in a segment comprised between cutter positions if more than one cutter is used, bears a prime relation to the number of teeth in each master pinion. In the particular machine illustrated there are three cutters disposed 120 degrees apart and in each third of the master gears there is a prime number of teeth. Suppose, for example, there is only one cutter and that the master gear has 127 teeth while a master pinion having 12 teeth is meshing therewith, then at each rotation of the master gear the pinion will make $10\frac{7}{12}$ turns. In other words, a selected tooth on the gear which was initially in engagement with tooth No. 1 of the master pinion would at the beginning of the second rotation engage with tooth No. 8, at the third rotation with tooth No. 3, the fourth with tooth No. 10, etc., there being a relative advance of seven teeth with each rotation of the master gear. At the end of the twelfth rotation, each tooth of the pinion would have been engaged by the selected tooth of the master gear and said tooth would then reengage pinion tooth No. 1. In other words, the gear must make as many turns as there are teeth in the pinion to complete a cycle in which a selected tooth of the gear would engage each tooth of the pinion. Since the cutter corresponds in position to one of the teeth of the master gear and revolves at the same speed as the master pinion, it will be evident that, in the specific gear ratio given above, the cutter, on successive orbital revolutions, will cut the blank at points seven tooth intervals apart and at the end of the cycle of twelve revolutions will have cut twelve notches symmetrically disposed about the periphery of the blank. The cutter is at the same time fed gradually downward so that its orbit is a comparatively flat helix. Thus, at the end of the next cutting cycle each notch will have been carried farther down the face of the gear and so in time the cuts are extended downward by successive cycles until they traverse the entire face of the blank and the gear is completed. When three cutters are employed, as in the particular embodiment chosen for illustration, the number of revolutions of the cutter table per cycle is divided by three. In other words, if it took twelve revolutions to complete a cycle with a single cutter it would take only four with three cutters.

With this general outline of the principle employed in my invention we can now proceed with a specific description of the machine illustrated in Figs. 1 to 4 inclusive.

The main frame of the machine is provided with a substantially cylindrical portion 10 in which a sleeve 11 is mounted to rotate on a vertical axis. Slidably fitted within this sleeve is a cylinder or drum 12 which carries a circular table 13 at its upper end. One or more keys 14 fitted in the periphery of the cylinder slide in keyways 15 formed in the sleeve 11 so that rotation of the cylinder or table with respect to the sleeve is prevented, although the table is permitted to move axially with respect to the sleeve.

Any suitable means may be provided for driving the sleeve at a constant rate. As shown in the drawings, I use a worm drive, there being a worm 16 journalled in the frame and meshing with a worm gear 17 fixed to the sleeve. Axial movement of the table is effected by a vertical screw 18, coaxial with the table and engaging a nut 19 carried by the cylinder. The screw is mounted to rotate in the main frame of the machine and has a worm gear 20 secured thereon and engaged by a worm 21. The worms 16 and 21 are driven by suitable means which will be described hereinafter. When the screw 18 rotates at the same speed as the sleeve 11 there will obviously be no vertical feed of the table, but by varying the rotation of the screw 18 in one direction or the other the table will be fed upward or downward at a rate depending upon the differential speed of the screw 18 with respect to that of the cylinder 11.

Mounted on the table are a number of carriages 24, each of which carries a circular gear cutter. In the particular embodiment illustrated there are three carriages adjustable in radially disposed ways 25, set at angles of 120 degrees apart. Suitable means, such as crews 26, may be provided for adjusting the radial position of each carriage, after which it is securely bolted to the table at the desired adjustment by means of bolts 27. The gear cutter 28 mounted on each carriage has a worm gear 29 fixed thereto and the latter is driven by a worm 30 splined upon a shaft 31. The shafts 31 of the three carriages find bearings near their inner ends in a central bracket 32 rising from the table. Each shaft 31 is connected by a suitable train of gearing 33 to a main driving pinion 34 on the armature shaft of a motor 36 carried by the bracket 32.

The main frame of the machine is formed with a cylindrical wall 37 concentric with the portion 10 but spaced therefrom. At the upper end of the wall 37 there is a flange or shelf 38 on which brackets 39 are adjustably mounted. Each bracket carries a gear blank 40 secured upon a vertical spindle 41 (Fig. 3) which at its lower end has a master pinion 42 fixed thereto. Each pinion is of the same pitch diameter as that of the gear blank connected therewith. The master pinions engage a common central gear 43 which is fixed to the sleeve 11 so that as the latter is rotated all of the blanks 40 will be individually rotated at a common peripheral speed, regardless of their respective diameters.

Since the machine is adapted to cut gears of different sizes, provided they are all the same pitch, the brackets 39 must be adjustable toward and from the table. It is essential that the master pinions be accurately disposed with respect to the master gear 43 and for this reason a gage ring 44 of hardened steel is secured to the master gear. The outer periphery of this ring corresponds exactly to the pitch circumference of the master gear. Each master pinion is also provided with a gage disc 45 of hardened steel whose diameter corresponds exactly to the pitch diameter of said master pinion. Consequently, in setting up the machine it is merely necessary to push each bracket 39 inward until its disc 45 engages the ring 44. The master pinion will then be properly set with respect to the master gear and the bracket may then be secured at such setting by means of a bolt 46. It does not matter what diameter of blank is to be cut, because for each size of blank a master pinion of corresponding size is secured to the spindle and each master pinion has its own gage disc so that the proper setting of the various master pinions and the blanks carried thereby calls for no particular skill but may be performed by any operative. The brackets 39 are preferably secured to the shelf 38 by bolts 39' which engage annular T slots 38' formed in the shelf so that the brackets are adjustable circumferentially for gear blanks of different sizes. The bolts pass through slots in the brackets which permit of adjustment toward or from the master gear.

The principle on which the machine operates has already been described. The cutters bear the same relation to the blanks that the master gear does to the pinions. In fact, the cutters may be considered as three equally spaced teeth of a mutilated gear of the same pitch diameter as that of the master gear. However, the "teeth" of the mutilated gear are rotated as well as revolved so as to cut tooth spaces in the blanks of exactly the same contour as the teeth in the master pinions connected respectively to said blanks. They do not drive the blanks since the latter are driven by the master gear. In fact, the blanks may have a slight lead on the cutters as will now be explained.

It will be manifest that the master gearing must approach as closely as possible to geometric perfection at the cutting positions. In the case of the master gear extreme accuracy is not essential throughout but only in a few teeth which underlie each cutter, because these teeth control the position and rotation of each blank while a tooth space is being cut therein. Since a slight back lash might develop and in fact must always be present in minute degree between the teeth of the master gearing, at the cutting positions, each master pinion is given a slight bias tending to make its teeth hug either the leading or the trailing tooth flanks of the master gear teeth. Preferably, the pinions are urged to rotate at a slightly higher peripheral speed than that of the gear so that the leading flanks of the pinion teeth will be pressed against the trailing flanks of the master gear. This bias is effected by providing a second central gear 47 under the master gear and providing auxiliary pinions 48 on the spindles in mesh with gear 47. The pinions 48 are not fixed on the spindles 41 but are pressed by spring washers 49 in frictional engagement with the master pinions, or, strictly speaking, with the gage discs 45. The gear 47 is provided with one tooth more than the master gear 43 so that it drives the pinions 48 at a slightly higher speed than that of the master pinions 42, and the frictional drag causes the master pinions to press forwardly upon the master gear. Actually the driving of the pinions is effected by the auxiliary gear 47 while the master gear 43 acts as a curb on the speed of the pinions.

The rate at which the table is fed downward is determined by the cutting cycle of the largest blank to be cut. If, for instance, a gear having 18 teeth is to be cut it will take six orbital revolutions of the three cutters to complete a cycle and the feed must be regulated so that the tooth spaces being cut will advance across the face of the gear at a desired rate per cycle. If gears of smaller pitch diameter are being cut at the same time, their cutting cycles will be shorter and the traverse across the face of the latter gears will obviously be slower per cycle. Provision is therefore made to vary the axial feed of the table as will be described hereinafter.

In setting up the cutters it is essential that they be adjusted radially until they just touch a geometric projection of the addendum cylinder of the master gear. This adjustment may be effected by a suitable gage, not shown, and the carriage is bolted fast at such adjustment. If during a run of the machine, one of the cutters becomes dull, it is not necessary to stop the machine to resharpen the cutter. All that has to be done is to retract the cutter carriage, so that the cutter will do no more cutting. The cutting may then proceed with only two operative cutters and the cutting cycle will be thereby proportionately extended. If a second cutter becomes dull the latter also may be withdrawn and the machine then will have to make still more revolutions per cutting cycle. However, it is necessary to adjust the axial feed of the table accordingly, otherwise the cutters would traverse the gear blanks at too high a rate per cutting cycle. Provision is therefore made for adjusting the feed in proportion to the number of cutters that are in service.

The driving and feed mechanisms will now be described. As shown in Fig. 4, the worm 16 which drives the worm wheel 17 on sleeve 11, is fixed upon a main drive shaft 50 driven by a motor 51. The worm 21 which drives the worm gear 20 on the screw 18 is fixed upon a shaft 52. A pinion 53 fixed upon the shaft 50 meshes with a gear 54 which is journalled upon the shaft 52. This gear drives the shaft 52 through a differential gearing. Fixed to turn with the gear 54 is a bevel pinion 55 which meshes with a pair of opposed planetary pinions 56 secured to the shaft 52 and the planetary pinions in turn mesh with a bevel pinion 57 journaled on said shaft. A gear 58 is fixed to turn with the gear 56 and the gearing is so chosen that when the gear 58 is held stationary the screw 18 will turn at the same speed as the sleeve 11 and in the same direction, so that there will be no vertical feed of the table. The feed of the cutter table may then be effected by rotating the gear 58.

A jack shaft 60 is driven by a suitable train of gearing from the main shaft 50 and this train includes a set of change gears 61 whereby the speed of the jack shaft may be varied. Fixed upon the shaft 60 is a small pinion 62, a large pinion 63 and a pinion 64 of intermediate pitch diameter. These pinions are in engagement with gears 65, 66 and 67 respectively, mounted on a shaft 68. The gear 65 is connected by an overrunning clutch (not shown) to the shaft 68 so that said shaft may be driven by the gear 65 but is free to rotate at a higher speed. The gears 66 and 67 are freely journalled on the shaft 68. Between said gears is a clutch member 70 which is splined to the shaft 68 and is slidable in one direction or the other to connect either gear 66 or 67 operatively to the shaft 68. A suitable clutch lever 71 is provided for sliding the clutch member. Fixed to one end of the shaft 68 is a pinion 72 which meshes with a pinion 73 journaled upon a shaft 74. The shaft 74 has a pinion 75 fixed thereon which meshes with the gear 58. Also mounted on the shaft 74 and normally free to turn thereon is a gear 76 which meshes with a pinion 77 fixed upon the main drive shaft 50. The clutch member 78 is splined upon the shaft 74 and may be slid axially by a clutch lever 79 to engage either the gear 73 or the gear 76.

Fig. 4 shows the arrangement of the gearing when the machine is not feeding. The clutch 78 is in neutral position and the gear 58 is standing still; hence although the sleeve 11 is rotating, the screw 18 is turning in the same direction and at the same speed so that there is no vertical feed. When it is desired to feed the table downward the clutch lever 79 is operated to connect the gear 73 to the shaft 74. The screw 18 will then be rotated at a differential speed tending to feed the table downward. Primarily this speed is controlled by the change gears 61. The gearing may be traced through the change gears to shaft 60 and thence by way of gears 63 and 66, clutch 70, shaft 68, gears 72 and 73, clutch 78, shaft 74, and pinion 75 to gear 58. When the cutters have traversed the faces of the blanks so that the horizontal diameter of the cutters passes below the lower edge of the blanks, the cutting is completed and the machine may then be stopped by stopping the motor, a suitable switch (not shown) being provided for this purpose. After the gear blanks have all been withdrawn the clutch lever 79 is operated to disengage gear 73 and engage gear 76. Then when the motor is started the rotation of the gear 58 will be reversed and the table will be fed rapidly upward in preparation for a new run. If during a run of the machine, one of the three cutters becomes dull and is withdrawn from cutting position, the lever 71 is operated to throw the clutch member 70 out of engagement with gear 66 and into engagement with gear 67. This will result in driving the shaft 68 at a lower speed and hence reducing the rate of downward feed of the table. If two of the cutters become dull and have to be withdrawn from cutting position, the clutch member 70 is moved to an intermediate position in which neither gear 66 nor gear 67 is connected to the shaft 68 and then the drive takes place through the pinion 62, gear 65 and the clutch connecting the latter to shaft 68.

So far I have described the cutting of spur gears. To cut spiral gears a modified method and machine are employed. As shown in Fig. 5 the modified machine differs from the machine previously described in the fact that the cutters are set at the pitch angle of the teeth to be cut and the table is adapted to be fed spirally downward. In order to provide accurate spacing of the teeth for different sized blanks, the master gear and master pinions are also provided with spiral teeth of the same pitch angle.

In Fig. 5 the principal parts of the machine which correspond to those of the machine shown in Figs. 1 and 2 are designated by the same reference numerals, while the parts that have been modified are indicated by corresponding reference numerals with the suffix a. Thus, on the table 13 are mounted carriages 24a only one of which is shown in the drawings. The carriage 24a is provided with an inclined cutter bearing so that the cutter 28 will lie at the proper tooth angle of the gears to be cut. The table cylinder or drum 12 is provided with a spirally disposed key 14a which engages a spiral keyway 15a formed in the sleeve 11. The master spiral gear is shown at 43a and meshing therewith are a number of master spiral pinions 42a, each of which drives a blank 40a. In order to place a bias on the master pinions a spiral gear 47a is provided having one more tooth than the master gear 43a, and the gear 47a meshes with spiral pinions 48a which impart a forward drag on the master spiral pinion 42a due to the spring washers 49. The operation of this machine is exactly like that described above, except that a spiral feed is given to the table which corresponds in angle to the pitch angle of the teeth. With this machine spiral gears of different pitch diameter may be cut simultaneously.

Obviously, instead of cutting a single gear on each spindle a set of narrow blanks may be mounted thereon, so that at one setting of the machine the number of gears cut may be a multiple of the number of spindles available. Obviously, all the gear blanks on a single spindle would be of the same diameter.

While I have described a preferred embodiment of my machine adapted for cutting spur gears and also a modification thereof for cutting spiral gears I wish it to be understood that these are to be taken as illustrative and not limitative of my invention and that I reserve the right to make such changes in form, construction, and arrangement of parts as fall within the spirit and scope of the following claims. It will also be understood that grinding wheels could be substituted for the circular cutters to adapt the machine for grinding gear blanks, and accordingly in the following claims the term "cutters" is used in its generic sense to include grinding wheels or any other rotary tools adapted for forming, grinding, dressing or finishing the teeth in the blanks.

I claim:

1. A gear cutting machine comprising a turn table provided with a master gear, a plurality of cutters carried by the table and rotatable in a plane radially disposed with respect to the axis of the table, each cutter having a portion of its periphery in alinement with a tooth of the master gear and formed in section to correspond accurately to the contour of said tooth, a master pinion meshing with the gear, means for mounting a gear blank coaxially rigid with said master pinion, said blank being of the same pitch diameter as said pinion, the cutters being disposed at equal angles apart and the number of teeth in each sector of the master gear corresponding to the angular spacing of the cutters being a prime number, means for driving the master gear, an auxiliary pinion coaxial with and frictionally engaging each master pinion, and a driving gear for said auxiliary pinions coaxial with and of the same pitch diameter as the master gear and fixed to rotate with the master gear, the gear ratio between the driving gear and auxiliary pinions being slightly different from that between the master gear and master pinions.

2. A gear cutting machine comprising a turn table provided with a master gear, a plurality of cutters carried by the table and rotatable in a plane radially disposed with respect to the axis of the table, each cutter having a portion of its periphery in alinement with a tooth of the master gear and formed in section to correspond accurately to the contour of said tooth, a master pinion meshing with the gear, means for mounting a gear blank coaxially rigid with said master pinion, said blank being of the same pitch diameter as said pinion, the cutters being disposed at equal angles apart and the number of teeth in each sector of the master gear corresponding to the angular spacing of the cutters being a prime number, means for driving the master gear, an auxiliary pinion coaxial with and frictionally engaging each master pinion, and means for driving said auxiliary pinions at a slightly higher speed than that of the master pinions.

3. A gear cutting machine comprising a central gear, a plurality of pinions arranged in an orbital series and meshing therewith, means for mounting a gear blank coaxially rigid with each pinion, said blank being of the same pitch diameter as that of the pinion associated therewith, a table connected with the gear in concentric relation thereto, a plurality of circular cutters mounted on the table and adjustable radially thereon at equal angles apart to engage said blanks, the periphery of each cutter being formed in section to correspond accurately with the contour of a tooth of the gear, means for rotating the cutters, driving mechanism for causing relative rotation of the gear and table with respect to the pinions and gear blanks, feeding mechanism for effecting a relative axial feed of the table with respect to the orbital series of blanks, means for controlling the relative speed of the driving and feeding mechanism, said feeding mechanism including shift gear providing as many relative speeds as there are cutters whereby whenever a cutter is withdrawn from operative position the rate of feed may be correspondingly reduced.

4. A machine of the character described comprising a master gear, an orbital series of pinions meshing therewith, means for securing a gear blank coaxially rigid with each pinion, a turn table coaxial with said series, a rotary cutter mounted on the turntable and adapted to be carried by the turntable into cutting engagement with the blanks sequentially, means for rotating the gear and the turntable at slightly different speeds and simultaneously feeding the turntable axially so as to effect a helical development, across the face of the blank of the cuts made by the cutter across the face of the blank.

5. A machine of the character described comprising a master gear, an orbital series of pinions meshing therewith, means for securing a gear blank coaxially rigid with each pinion, a turn table coaxial with said series, a rotary cutter mounted on the table and adapted to be brought into cutting engagement with said blanks sequentially, a driver for rotating the gear and the turntable, and means adapted to feed the table axially as it rotates, said driver having a fixed connection with said gear, and a helical spline connection with the turntable so as to effect a helical development of the intermittent cuts made by the cutter across the face of each blank.

6. A machine of the character described comprising a turntable, circular cutters radially disposed thereon at equal angles apart, a master gear concentric with the turntable and having driving connection therewith, means for driving said gear, an orbital series of master pinions meshing with the master gear, gear blanks coaxially rigid with said pinions respectively and in position to be engaged and cut by each cutter, the gear ratio of the master gear to each master pinion being such that upon successive engagement of each blank with a cutter, different tooth spaces will be cut, means for feeding the table helically with respect to the gear in accordance with a desired pitch angle so that the intermittent cuts produced in the blanks by each cutter will be developed spirally across the face of each blank, and means for rotating each cutter in a plane corresponding to said pitch angle, the periphery of each cutter being contoured to cut teeth of selected form in each blank.

7. A machine of the character described comprising a turntable, a master gear, means for rotating the turntable and gear, an orbital series of master pinions meshing with said gear, means for securing a gear blank coaxially rigid with each of said master pinions, each blank being of the same pitch diameter as the master pinion associated therewith, a cutter mounted on the turntable and in position to be brought into cutting engagement with said blanks sequentially, the gear ratio between the master gear and the master pinions being such as to bring a different tooth space into engagement with the cutter upon successive revolutions thereof, an auxiliary pinion coaxial with and frictionally engaging each master pinion, and a driving gear for said auxiliary pinion coaxial with and of the same pitch diameter as the master gear and fixed to rotate with the master gear, the gear ratio between the driving gear and auxiliary pinions being slightly different from that between the master gear and master pinions.

8. A method of cutting helical teeth in a gear blank with a circular cutter having a periphery corresponding in radial section to a selected tooth contour, which comprises the steps of effecting a relative roll between such peripheral section and the gear blank along a helical orbit coincident in plan with the pitch circle of such peripheral section, simultaneously rotating the cutter in a plane disposed at a selected pitch angle with respect to the axis of said orbit, the radii of the pitch circles of said section and said blank being so related that at each orbital revolution the cutter will cut a different tooth space of the blank until a cycle is completed in which every tooth space has been cut, continuing the cutting through a series of said cycles to advance each tooth-cut intermittently across the face of the blank, and slightly varying the relative peripheral speed of the blank with respect to the orbital speed of the cutter so that each tooth-cut will be developed across the face of the blank at said selected pitch angle.

9. A method of cutting helical teeth in a gear blank with a circular cutter having a periphery corresponding in radial section to a selected tooth contour, which comprises the steps of revolving the cutter in a helical orbit coincident in plan with the pitch circle of such peripheral section, simultaneously rotating the cutter in a plane disposed at a selected pitch angle with respect to the axis of said orbit, mounting the blank in position to be intermittently cut by the revolving cutter and rotating the blank to provide a rolling engagement thereof with the cutter, the radii of the pitch circles of said section and said blank being so related that at each orbital revolution the cutter will engage a different tooth space of the blank until a cycle is completed in which every tooth space has been cut, continuing the cutting through a series of said cycles to advance each tooth-cut intermittently across the face of the blank, and giving the blank a slightly different peripheral speed from the orbital speed of the cutter so that each tooth-cut will be developed across the face of the blank at said selected pitch angle.

10. A method of cutting helical teeth in a plurality of blanks of dissimilar pitch diameters with a circular cutter having a periphery corresponding in radial section to a selected tooth contour, which comprises the steps of setting up said blanks in an annular series, effecting a relative roll between such peripheral section of the cutter and the gear blanks progressively along a helical orbit coincident in plan with the pitch circle of said peripheral section, simultaneously rotating the cutter in a plane disposed at a selected pitch angle with respect to the axis of said orbit, the radius of the pitch circle of said section and the various dissimilar radii of said blanks being so related that at each orbital revolution the cutter will cut a different tooth space of each blank until a cycle is completed in which every tooth space has been cut, continuing the cutting through a series of said cycles to advance each tooth-cut intermittently across the face of the blank by a series of separate cuts, and slightly varying the relative peripheral speed of each blank with respect to the orbital speed of the cutter so that each tooth-cut will be developed across the face of the blank at said selected pitch angle.

11. A helical gear cutting machine comprising a turntable, a circular cutter adjustable radially thereon, a master gear concentric with the table and connected therewith, an orbital series of master pinions meshing with said gear, means for mounting a gear blank coaxially rigid with each of said pinions, said blank being of the same pitch diameter as the pinion associated therewith, means for rotating the cutter at an angle to the table corresponding to a selected pitch angle, means for effecting relative rotation of the gear and pinions whereby the blanks will be successively cut by the cutter, the ratio of the gear to each pinion being such that at each successive engagement of a blank with the cutter a different tooth space will be cut until a cycle is completed in which every tooth space has been cut, and means for feeding the table axially during a series of said cycles so that each tooth-cut will be developed by an intermittent series of cuts across the face of the blank, the connection between the table and gear including means for effecting a relative angular movement of the table with respect to the gear such that each tooth-cut will be developed in the direction of such pitch angle.

12. A helical gear cutting machine, comprising a turntable, circular cutters adjustable radially thereon at equal angles apart, a master gear concentric with and having driving connection with the table, means for driving said gear, an orbital series of master pinions meshing with said gear, means for mounting a gear blank coaxially rigid with each of said pinions and in position to be engaged and cut by each cutter, the ratio of the gear to each pinion being such that at each successive engagement of a blank with a cutter a different tooth space will be cut until a cycle is completed in which every tooth space has been cut, means for rotating each cutter at an angle to the table corresponding to a selected pitch angle, and means for feeding the table axially so that in a series of said cycles each tooth-cut will be developed by an intermittent series of cuts across the face of the blank, said driving connection being arranged and constructed to effect a relative angular movement of the table with respect to the gear so that each tooth-cut will be developed across the face of the blank in the direction of said pitch angle.

ADOLPH L. DE LEEUW.